United States Patent [19]
Helal et al.

[11] Patent Number: 5,154,504
[45] Date of Patent: Oct. 13, 1992

[54] COMMUNICATIONS AND TESTING FOR EMERGENCY SYSTEMS

[75] Inventors: Mohammed A. Helal; Larry Puckeridge, both of New South Wales, Australia

[73] Assignee: Minitronics Pty Limited, Brookvale, Australia

[21] Appl. No.: 606,153

[22] Filed: Oct. 31, 1990

Related U.S. Application Data

[63] Continuation-in-part of Ser. No. 401,120, Aug. 31, 1989, Pat. No. 4,977,353.

[30] Foreign Application Priority Data

Sep. 4, 1990 [AU] Australia ............................. PK2121

[51] Int. Cl.⁵ ............................................ F21V 19/04
[52] U.S. Cl. .................................. 362/20; 362/85; 362/276; 315/86; 340/514; 340/531
[58] Field of Search .................. 362/20, 85, 233, 276, 362/802; 315/86; 340/514, 531; 307/66

[56] References Cited

U.S. PATENT DOCUMENTS

| | | | |
|---|---|---|---|
| 4,799,039 | 1/1989 | Balcom | 340/333 |
| 4,827,244 | 5/1989 | Bellavia et al. | 340/514 |
| 4,901,056 | 2/1990 | Bellavia et al. | 340/514 |
| 4,945,280 | 7/1990 | Beghelli | 315/86 X |
| 4,977,353 | 12/1990 | Helal et al. | 307/66 X |

FOREIGN PATENT DOCUMENTS

| | | |
|---|---|---|
| 80744/82 | 9/1982 | Australia . |
| 0102229 | 3/1984 | European Pat. Off. . |
| 0143993 | 6/1985 | European Pat. Off. . |
| 0361993 | 4/1990 | European Pat. Off. . |

OTHER PUBLICATIONS

Dual-Lite catalog, "Spectron II Emergency Lighting Communincation System", 14 pages, Apr. 1988: Dual-Lite, PO Box 468, Newtown Conn. 06470.

Primary Examiner—Stephen F. Husar
Attorney, Agent, or Firm—Jacobson, Price, Holman & Stern

[57] ABSTRACT

The present invention relates to emergency systems used in buildings, and particularly to emergency lighting systems whose function is to provide emergency illumination in the event of failure of primary (e.g. mains) power supply. As such systems must have the ability to operate correctly in any emergency it is necessary to ensure, by regular checking, that the emergency capability is maintained at all times. In an emergency lighting system the emergency capability is usually provided by a back-up power supply, which switches in on failure of the main power supply. Regular checks of the back-up power supply are required to make sure that it is capable of functioning in times of emergency. In the present invention, to facilitate the checking procedure, each emergency unit has a self-contained testing facility. This testing facility is operative to perform regular checks on the capability of the back-up supply. A user operable control unit is provided to gather the test results performed by each individual unit, and has the capability to instigate testing sequences if required. The control unit communicates with each emergency unit by wireless means, preferably infrared communications.

14 Claims, 8 Drawing Sheets

INTERNAL PRESSURE / CHARGE CURRENT / VOLTAGE

FIG. 4

```
1) PROGRAM NEXT TEST
2) RETRIEVE DATA
```

FIG. 5a

```
TEST STARTED
```

FIG. 5b

```
COMMUNICATIONS
FAILED
```

FIG. 5c

```
TEST STOPPED
```

FIG. 5d

ENTER NUMBER OF DAYS

FIG. 5e

PROGRAMMED

FIG. 5f

1) RETRIEVE DAYS
2) RETRIEVE TEST DATA

FIG. 5g

TO NEXT TEST = 34
BETWEEN TESTS = 182

FIG. 5h

```
T=207 V=4.10  I=1.03
Lmp=YES TEST=PROGRAM
```

FIG. 5 i

```
T=207 V=4.10  I=103
Lmp=YES TEST=MAINS
```

FIG. 5 j

```
ENTER SPU NUMBER
```

|   |   |   |   |
|---|---|---|---|
| 7 | 8 | 9 |   |
| 4 | 5 | 6 |   |
| 1 | 2 | 3 |   |
| CLEAR | 0 | ENTER | CANCEL |

FIG. 7

MON 09/05/88  11:21:45
LAST TEST
==============

| UNIT | TIME (M) | CURRENT (A) | VOLTAGE (V) | LIGHT ON | MAINS FAIL |
|------|------|---------|---------|-----|------|
| 001 | 207 | 1.30 | 4.10 | YES | NO |
| 002 | 134 | 1.09 | 5.10 | YES | NO |
| 003 | 123 | 0.98 | 4.10 | YES | NO |

COMMUNICATIONS AND TESTING FOR EMERGENCY SYSTEMS

CROSS-REFERENCE TO RELATED APPLICATIONS

This application is a continuation-in-part of U.S. application Ser. No. 401,120 filed Aug. 31, 1989, now U.S. Pat. No. 4,977,353.

BACKGROUND OF THE INVENTION

The present invention relates generally to emergency systems for installation in buildings and the like, and in particular to emergency lighting and/or burglar alarm and/or fire alarm systems having a testing facility for maintenance purposes.

In many buildings, such as, for example, hotels and office buildings, should the mains power supply to the lighting system fail, due to fire, for example, emergency illumination must be provided, usually by lighting units having their own emergency power supply (e.g. battery driven). Further, buildings may be provided with clearly illuminated signs marking exits and directions towards exits, as part of the emergency lighting system.

In most countries, strict standard requirements are provided for such emergency systems.

In Australia, the present Standard states that all emergency lights should be tested every six months i.e. to make sure they are capable of correct functioning in an emergency. However, due to cost and neglect, the Standard is seldom complied with. The Standard (Australian Standard AS2293.2-1987) includes two parts, as set out below:

Part 1: Design and Installation. Reads in part: "The nature of an emergency lighting system is such that one can never predict when it may be called upon for function. Consequently while it is important that the system be correctly installed and operate satisfactorily initially, it is equally important that regular inspection and maintenance procedures be instituted to ensure that the system will be in a state of readiness for operation at all times".

Part 2: Inspection and Maintenance. Describes the precise inspection and maintenance procedures necessary to ensure that the system is in a state of readiness at all times.

With prior art Australian systems, inspection is carried out physically on a six monthly basis and performance details manually recorded. This is a time-consuming and costly exercise. Failure to carry out prescribed maintenance will result in deterioration of the system, particularly with regard to battery life and efficiency—both of which will be drastically reduced.

Due to the high cost of maintenance, and neglect, these inspection procedures are seldom met. It is also a fact that replacement of damaged batteries is considerably more expensive than periodic manual maintenance. Paramount to maintenance costs is the necessity that the installation should be fully operational in the event of an emergency. The proper operation of an emergency lighting system can prevent injuries and save lives.

There is therefore a need for an emergency lighting system wherein testing and maintenance procedures are facilitated.

There are also a number of other types of emergency systems, other than emergency lighting systems, which need to be maintained in good working order in case of emergency. Examples are emergency systems such as smoke detector systems, fire alarm systems, burglar alarm systems, etc. There is also a need for reliable testing and maintenance procedures for systems such as these.

Further, prior art emergency lighting systems are known which incorporate communication systems connecting various individual lighting units for the convenient retrieval of test data taken at regular intervals from the individual lighting units. Such a system is disclosed in U.S. Pat. No. 4799039 (assigned to Dual Lite). In this system, however it is necessary to connect each of the individual emergency lighting units together with wiring for communication of the test data. On installation of such a system, this obviously gives rise to a great deal of labour for the wiring installation.

A further such system is disclosed in European patent application No. 0102229 (owned by Monicel). Here, the mains wiring is used for communication of test data between the individual lighting units in the controller. It is, however, necessary to install a number of communication interfaces to enable sending and receiving of data along the mains wiring, and this gives rise to added labour and complications in the circuitry.

The present invention provides an emergency system for providing an emergency function, comprising a plurality of emergency units each having means for providing the emergency function in the event of failure of a primary power supply and testing means for testing predetermined parameters of the unit relating to its capability of providing the emergency function in the event of failure of the primary power supply, and a control unit having wireless means for communicating with each emergency unit, whereby to obtain results of a test by the testing means and/or to instruct test parameters for each unit.

The means for communicating preferably comprises a transceiver unit provided in the control unit. A corresponding transceiver unit is preferably located in the emergency unit.

The means for communicating of the control unit preferably comprising means for communicating via infrared signalling and preferably comprises an infrared transceiver.

The control unit may be a portable unit and is preferably a hand held device.

The emergency system may be an emergency lighting system and the emergency unit is preferably an emergency lighting unit having means for providing illumination as the emergency function even in the event of failure of the primary power supply. The emergency lighting unit preferably includes a processor for carrying out testing functions and for controlling the emergency illumination function.

The parameters monitored in the case of an emergency lighting system preferably include the voltage and the current of a back-up power supply (e.g. Ni-Cad batteries), preferably used to provide power for the emergency illuminations in the event of failure of the primary power supply (e.g. standard mains power supply), and the light status of an emergency lamp.

The processor of the emergency lighting unit, when included, can preferably be programmed to perform specified tests at predetermined intervals.

The control unit preferably includes a processor for controlling its functions, and also preferably includes memory means for storing test results obtained from the emergency unit.

The control unit preferably includes means for programming the emergency unit to set, for example, the predetermined time interval for performing testing.

The control unit preferably includes means for allowing communication with a computer, so that, for example, test information can be taken from the control unit and entered to the computer for processing.

The lighting units, where the emergency system is an emergency lighting system, may provide illumination for signs (e.g. EXIT signs) building areas and any other illumination application.

As an alternative to portable unit, the control unit may comprise a unit which communicates with the emergency units from a relatively permanent location. In such a case, each emergency unit may be provided with its own individual address to allow individual access by the central control unit.

The present invention further provides a control unit for an emergency system for providing an emergency function wherein the emergency system comprises an emergency unit having means for providing the emergency function in the event of failure of a primary power supply, and testing means for testing predetermined parameters of the unit relating to its capability of providing the emergency function in the event of failure of the primary power supply, said control unit comprising wireless means for communication with the emergency unit, whereby to obtain results of a test by the testing means and/or to instruct test parameters for the unit.

The control unit may have any of the preferred features discussed above in relation to the control unit of the above aspect of the present invention. The emergency system may be an emergency lighting system as discussed above.

The present invention yet further provides an emergency unit for an emergency system, wherein the emergency unit comprises means for providing an emergency function in the event of failure of a primary power supply, testing means for testing predetermined parameters of the unit relating to its capability of providing the emergency function in the event of failure of the primary power supply, and wireless means for communication with a control unit, whereby to provide results of a test by the testing means to the control unit and/or to receive test parameter instructions from the control unit.

The wireless communication means is preferably a transceiver means which allows communication using infrared radiation as a signal carrier.

The emergency unit may have any of the preferred features described above in relation to the emergency unit of the other aspects of the invention and may be an emergency lighting unit for an emergency lighting system as discussed above.

The fact that self testing facilities are provided in the emergency units in accordance with the present invention means that testing and maintenance procedures for the emergency system are facilitated.

Provision of a central control unit or portable unit with wireless communications for gathering the test results when desired and possibly programming the emergency units for predetermined test intervals and test parameters facilitates the maintenance of the emergency system to the required standard.

The wireless communications give the advantage that it is not necessary to connect the emergency units in an emergency system with a plurality of units by wiring. Installing such wiring for communication between units and a central control unit would be expensive and require a great deal of labour. Nor is it necessary to provide special communication interfaces for communication along mains wiring.

Features and advantages of the present invention will become apparent from the following description of an embodiment thereof, with regard to an emergency lighting system, by way of example only, with reference to the accompanying drawings.

BRIEF DESCRIPTION OF THE DRAWINGS

FIG. 5, a to k, show examples of displays which may appear on a display of the portable unit of FIG. 4;

DESCRIPTION OF THE PREFERRED EMBODIMENT

Figure 1:
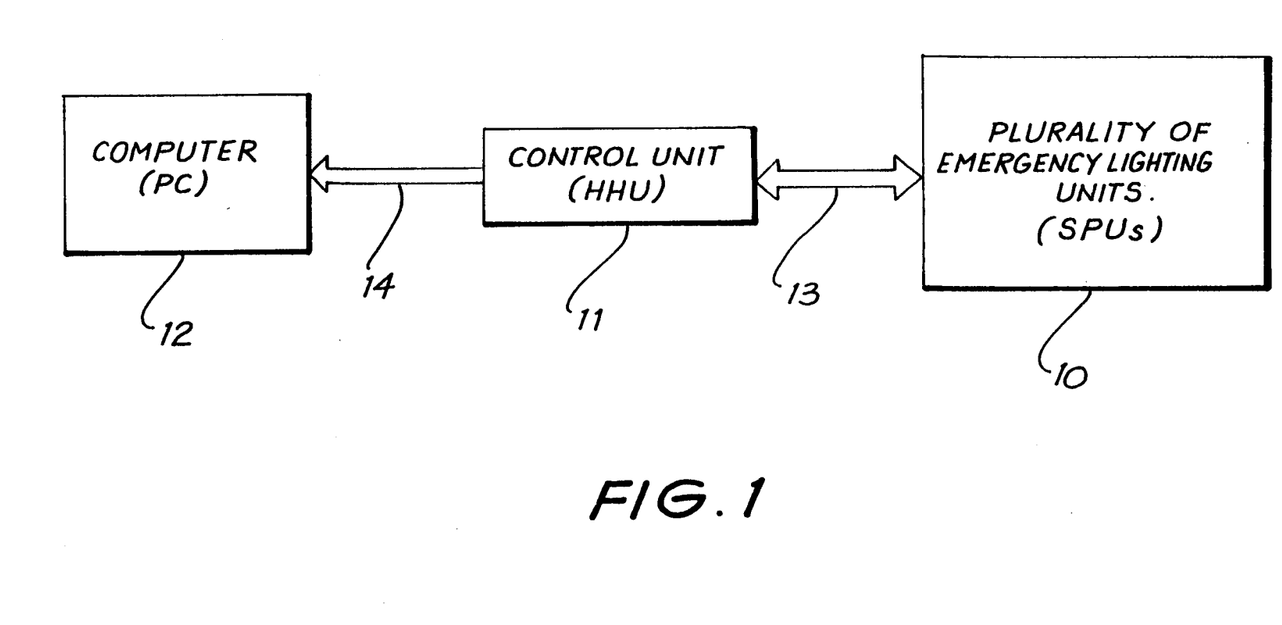
FIG. 1 is a schematic block diagram illustrating a generalised emergency lighting system in accordance with an embodiment of the present invention.

An emergency lighting system in accordance with the present invention can be comprised of three types of devices as schematically illustrated in FIG. 1:

i) The "Single Point Units" 10 (emergency lighting units) (SPUs) which have the function to supply light in the event of mains power failure and include a microcomputer which carries out self-checking functions, charging control and emergency detection—thus making the SPU an "Intelligent" product.

ii) The "Hand-Held Unit (HHU) 11 which controls all SPUs. The HHU has a 2 line by 16 character alphanumeric display (any other size or type of display could be used), key pad and infrared transceivers.

iii) The Personal Computer (PC) 12 which retrieves data from the HHU, stores the data on file and prints out reports.

The HHU 11 and SPUs 10 are arranged for two way wireless communications 13 to enable the HHU to retrieve data from the SPUs with various test parameters. The HHU11 and PC12 also have a communications link 14 to enable downloading of data from the HHU11 to PC12. The communications link 14 may be two-way.

Each SPU 10 will indicate by means of a flashing LED if it is faulty or otherwise operational. The system can consist of the SPUs 10 and a HHU 11. The HHU will display test results from each of the SPUs 10 (one at a time). The system may comprise all three devices, in which case the HHU 11 will transfer the test data for all SPUs 10 back to the PC 12 for storage and printout in a format for retention in the log book required by the Standard (Australian Standard or any other standard for which the system is programmed).

A Single Point Unit 10 comprises (diagrammatically shown in FIG. 2) an emergency luminaire containing a battery 25, battery charger 30, inverter 21 (where used), and controls 26 necessary for sensing failure of the mains power supply and for changing over to the emergency supply and vice versa.

Figure 2:
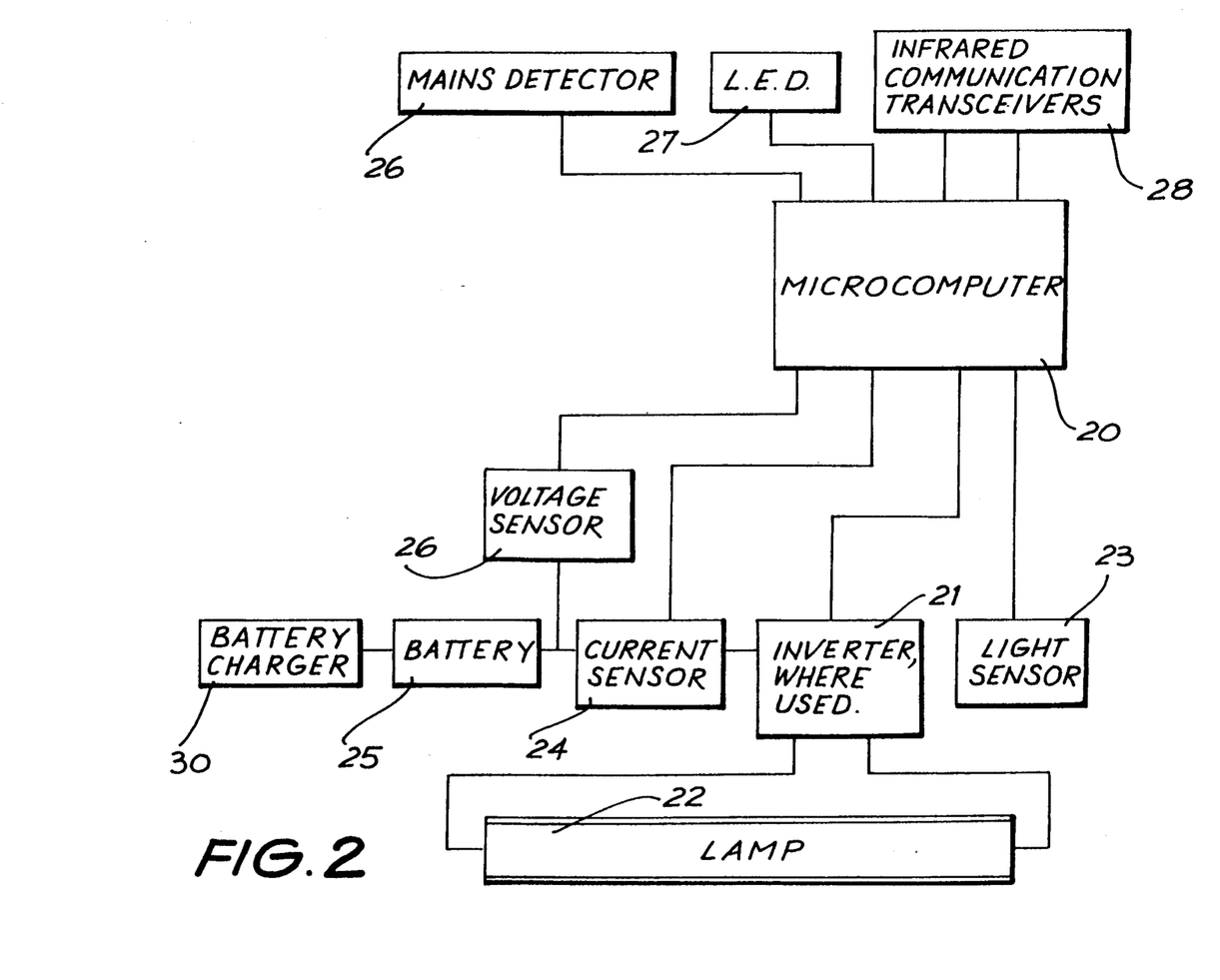
FIG. 2 shows a schematic block diagram of an emergency lighting unit of an emergency lighting system in accordance with the present invention.

The SPU 10 has a microcomputer 20 at its heart that controls all functions. When the microcomputer detects loss of mains power supply or a test start command from the HHU 11 or a preprogrammed test command, it disconnects the SPU 10 from the mains supply and starts the inverter 21 operating the emergency lamp 22 or, where the inverter 21 is not included, starts operating the emergency lamp 22 directly. It also monitors battery voltage and current and light output. In a test command situation, switchboard mains power supply is unaffected—only the supply to the SPU 10 under test is affected. When battery voltage drops to a pre-set cut-off voltage the microcomputer 20 records the time, voltage and current and then turns-off the inverter 21 and reconnects the unit to the mains power supply.

In a test situation the mains supply is unaffected. On instigation of a test a relay (not shown) switches mains power away from the battery charger 30 and emergency lamp 22 for the particular SPU, and connects the battery 25 to drive the inverter 21, or lamp 22 directly. This provides a "simulated failure" for test purposes. The relay may be internal to the SPU.

At present, in most dual rate battery charging systems, the battery is charged for a fixed pre-set period no matter how long the previous discharge. So, for example, if mains supply failed for a mere 30 seconds (or even if a momentary test were activated) the battery would receive a full charge period. This may result in overcharging the battery and reducing its life. From typical charging characteristics of Ni-Cad batteries (see FIG. 3), battery voltage increases during charging and, when fully charged, it starts to drop.

Figure 3:
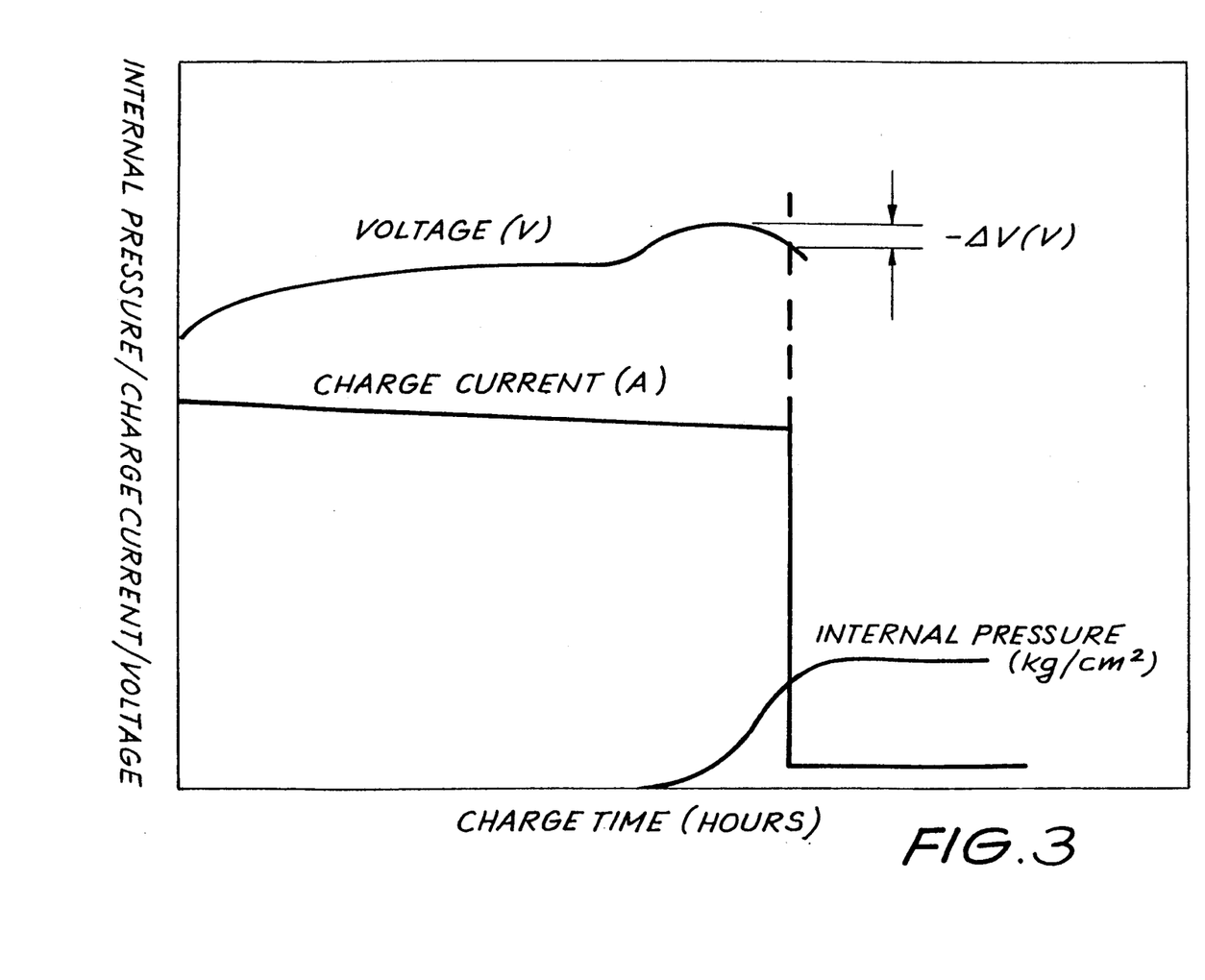
FIG. 3 is a graph showing typical characteristics of Ni-Cad batteries, which may be used as an alternative power supply in accordance with an emergency lighting system of the present invention.

With the automatic self-checking system, the battery 25 will not be charged unless the mains failure (or test) lasts longer than one minute. The system will then charge the battery 25 until the battery voltage peaks and starts to drop. Thus the battery 25 will only receive as much charge as it needs to reach full capacity.

In extreme environments battery voltage peak does not occur. This situation is catered for in that the charging period is pre-set to a maximum of 32 hours, to protect the battery 25 from overcharging.

Emergency lamps can be either incandescent or fluorescent. Incandescent lamps are operated through a relay or a solid-state switch controlled by the microcomputer. Fluorescent lamps are operated through a high frequency, high efficiency inverter that provides stable light output during the emergency or test period. This approach improves the luminaire's classification and hence reduces the number required to cover a specific area according to Standard AS2293.1-1987.

A pre-set cut-off voltage is used for different batteries—related to the number of cells used in the case of Ni-Cad batteries or to battery voltage in the case of Lead Acid batteries. This extends battery life.

In the automatic self-checking system of the present invention the LED 27 indicates one of five things:
(1) LED OFF - This indicates that either the mains power is off or the SPU 10 is under test.
(2) LED ON CONTINUOUSLY - This indicates that the battery 25 has been charged and the SPU 10 has no data for the HHU to retrieve.
(3) LED FLASHING (Normal Speed) - This indicates that the battery 25 is being charged and the SPU 10 has no data for the HHU 11 to retrieve.
(4) LED FLASHING (Slow Speed) - This indicates that the SPU 10 has test data to transmit to the HHU 11 and that it passed test.
(5) LED FLASHING (Fast Speed) - This indicates that the SPU 10 has test data to transmit to the HHU 11 and that it failed test.

Any other procedure can also be incorporated in the system to meet user specifications.

Figure 4:
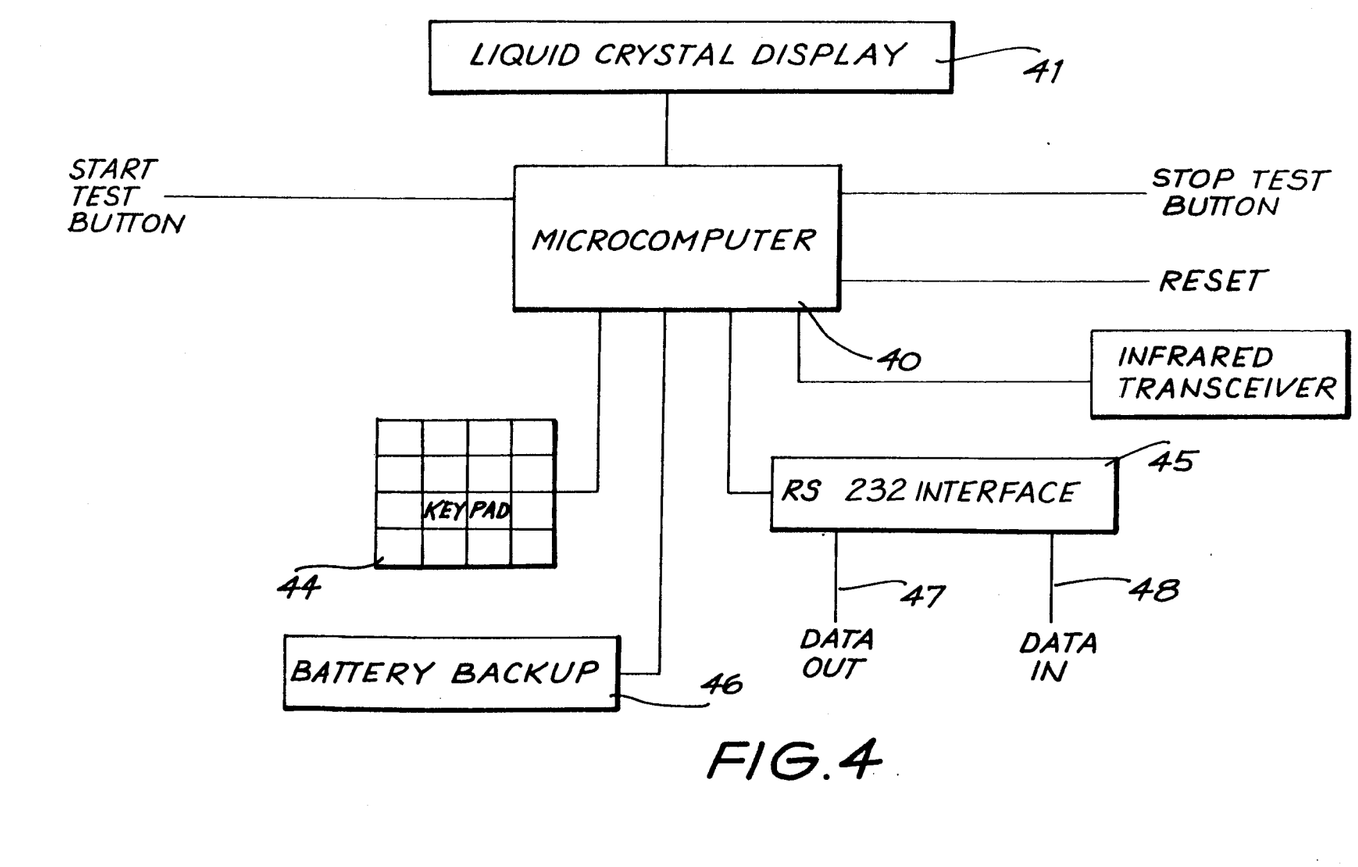
FIG. 4 shows a schematic block diagram of a portable control unit for use with an emergency lighting system in accordance with the present invention.

The HHU 11 incorporates hardware as diagrammatically shown in FIG. 4. The HHU 11 is controlled by the key pad 44 and push buttons.

Figure 5A:
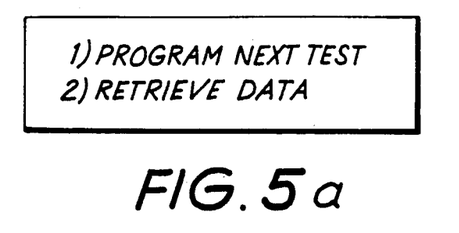

The HHU's 11 normal display mode is shown in FIG. 5(a). The display will only change when a function is selected.

The HHU 11 has six functions which are detailed below. Other functions can be incorporated as desired.

Figure 5B:
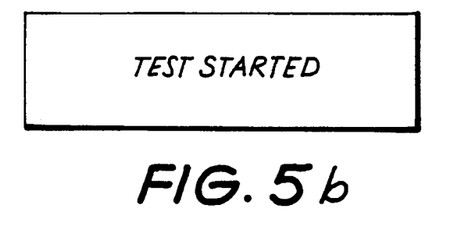

1) Start Test Function:

This function is initiated by pointing the HHU 11 towards the SPU 10 and pressing the Start Test button on the HHU 11. If the infrared communication is successful the HHU 11 display will change to "Test Started" (as shown in FIG. 5(b). The display will remain for a period of two seconds and then revert to the normal display.

Figure 5C:
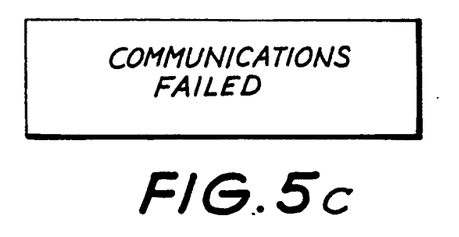

If the HHU 11 did not successfully communicate with the SPU 10 the display will change to "Communications Failed" (as shown in FIG. 5(c). Again the display will remain for a period of two seconds and then revert to the normal display.

When a test is started mains power failure will be simulated, the emergency lamp 22 on the SPU 10 will illuminate, and the LED 27 will turn off. The SPU 10 will remain in this state until the battery reaches cut-off voltage or for a maximum period of three hours (or such other maximum test period as required) or until the Stop Test function is selected. While under test the SPU 10 will record the time that the test lasts or the time until the battery reaches cut-off voltage.

Figure 5D:
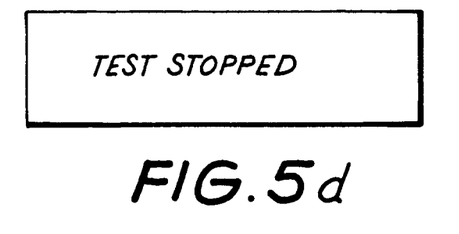

2) Stop Test Function:

This function is initiated by pointing the HHU 11 towards the SPU 10 and pressing the Stop Test button on the HHU 11. If the infrared communication is successful the display will change to "Test Stopped" (as shown in FIG. 5(d). The display will remain for a period of two seconds and then revert to the normal display.

If the HHU 11 did not successfully communicate with the SPU the display will change to "Communications Failed" (as shown in FIG. 5(c). Again the display will remain for a period of two seconds and then revert to the normal display.

The Stop Test function has the effect of returning mains power to the SPU 10.

Figure 6:
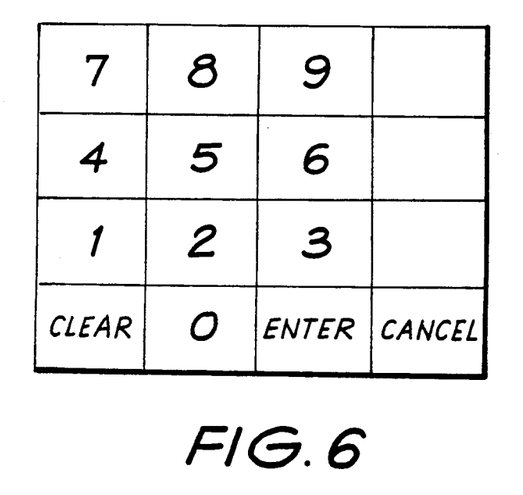
FIG. 6 shows a schematic diagram of the key pad of the portable unit of FIG. 4.

3) Program Next Test:

The SPU 10 can be programmed to do a test any selected number of days ahead. If the SPU 10 is not programmed then it has a default period of 90 days and a maximum test period of 3 hours or until battery cut-off voltage is reached. The default parameters can be varied to suit any requirement. The test is programmed by the HHU 11 as follows:

The "1" key on the key pad 44 (shown in FIG. 6) is pressed.

Figure 5E:
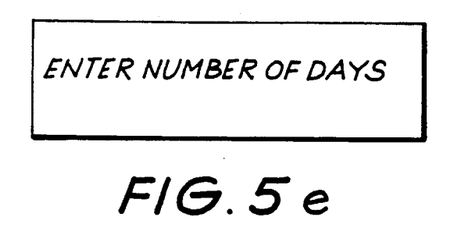

The display on the HHU 11 will change to "Enter Number of Days" (as shown in FIG. 5(e)).

The user should then enter the desired number of days, point the HHU 11 towards the SPU 10 and press the "Enter" key. If an incorrect number of days is pressed it can be cleared with the "Clear" key.

Figure 5F:
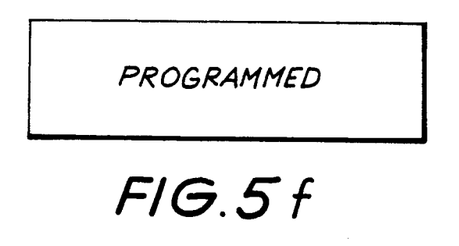

If the infrared communication is successful then the display will change to "Programmed" (as shown in FIG. 5(f). The display will remain for a period of two seconds and then revert to the normal display. If the communication was unsuccessful the display will change to "Communications Failed" (as shown in FIG. 5(c).

After the pre-set number of days have elapsed, the SPU 10 will automatically enter test mode and remain in such mode until the battery 25 reaches cut-off voltage or until a maximum period of three hours has elapsed (or such other maximum test period as has been programmed). At the end of the test the LED 27 on the SPU 10 will either flash at the fast rate (2 Hz) indicating that the test result was faulty or flash at the slow rate (½ Hz) indicating that the test result was successful. The criteria for faulty test result are—that either the emergency lamp did not illuminate or that the SPU 10 could not sustain light output for a period greater than 90 minutes (note that any time period could be chosen, depending on requirements of particular standard).

The flashing LED 27 indicates that there is test data in the SPU 10 for the HHU 11 to retrieve.

4) Retrieve Days:

This function will load the number of days to the next test and the number of days between tests from the SPU 10 into the HHU 11. This is done as follows:

The "2" key on the key pad is pressed.

The HHU 11 display will then change as shown in FIG. 4(g).

Point the HHU 11 towards the SPU 10 and press the "1" key.

Figure 5G:
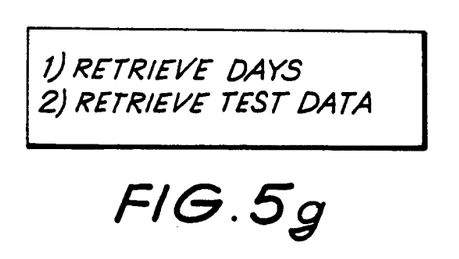
Figure 5H:
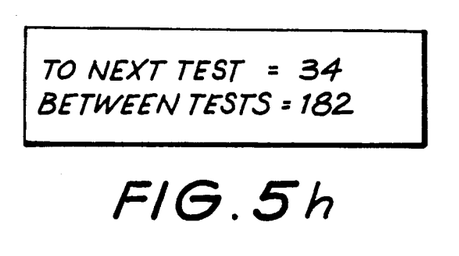

If the infrared communication is successful the display will change as in the typical display shown in FIG. 5(h). This display will remain until the "Cancel" key is pressed. If the communication failed the display will change as shown in FIG. 5(c) for a period of two seconds.

5) Retrieve Test Data:

This function enables retrieval from the SPU 10 of full test data. The data retrieved is the last test data. It is possible, depending upon user requirements, for the SPU 10 to store (and make available for retrieval) test data for the last five tests. This function is operated as follows:

If commencing from the normal HHU 11 display (as shown in FIG. 5(a), press the "2" key on the key pad to change the display to that shown in FIG. 5(g).

Point the HHU 11 towards the SPU 10 and again press the "2" key. If the infrared communication is successful the display will change as in the typical display shown in FIG. 5(i). This display will remain until either the "Cancel" key or the "Enter" key is pressed. If the communication failed the display will change as shown in FIG. 5(c) for a period of two seconds.

Figure 5I:
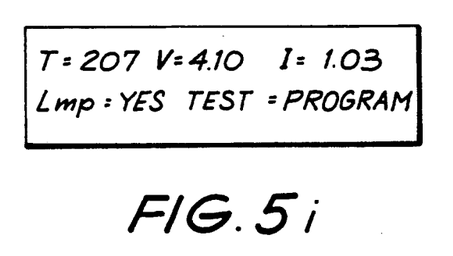
Figure 5J:
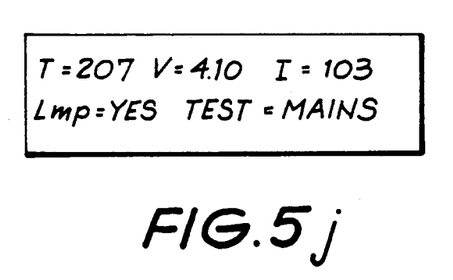

The typical display shown in FIG. 5(i) provides the following information:

| | |
|---|---|
| "Lmp = Yes" | The emergency lamp illuminated. |
| "T = 207" | The battery could sustain light output for 207 minutes. |
| "V = 4.10" | Battery voltage was 4.10 volts. |
| "I = 1.03" | Battery current was 1.03 Amp. |
| "Test-Program" | The test was a programmed test and not a mains supply test. (If the test were conducted by switching off mains power supply the display would appear as shown in FIG. 5(j). |

Following successful communication between the SPU 10 and the HHU 11, the SPUs 10 LED will either remain on continuously (indicating that there is no further data to be retrieved) or flash at normal speed (½ Hz) (indicating that the battery is under charge and that there is no further data to be retrieved).

Figure 5K:
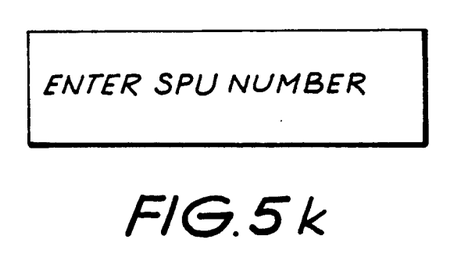

If the user does not desire the test data retrieved by the HHU 11 to be taken back to a personal computer (for storage and printout) pressing the "Cancel" key will cancel the display. To store the data in the HHU's 11 memory press the "Enter" key. The display will then appear as shown in FIG. 5(k). The HHU 11 requests that a SPU 10 number be allocated to this data. To enter the SPU 10 number simply press the number between 1 and 255 (representing one byte) allocated to the particular SPU. The system can be designed for installations having a greater number of SPUs 10 than 255, depending upon user requirements.

Figure 7:
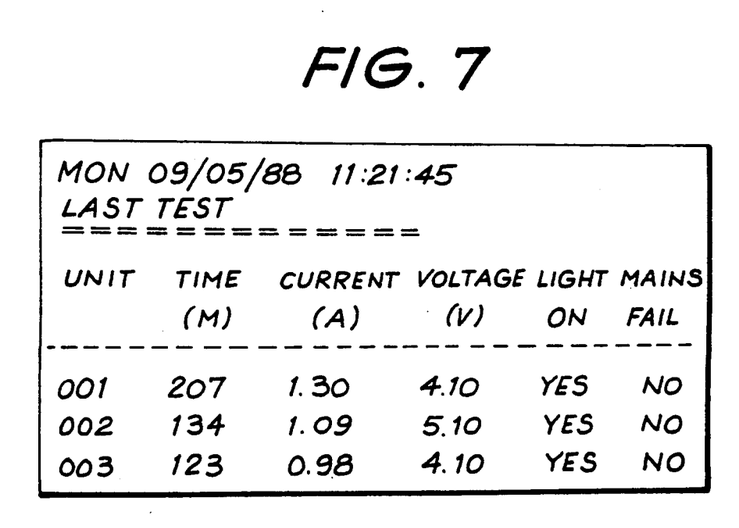
FIG. 7 shows an example of a print out from a computer used to process test results obtained from an emergency lighting unit via a portable unit as described in relation to FIG. 4.

6) Dump Data:

The data that has been retrieved from the SPUs 10 by the HHU 11 can be dumped into a personal computer so that reports such as the typical report shown in FIG. 7 can be stored and printed.

To dump the data into the PC 12 connect the HHU 11 to the PC 12 via a convenient interface (in this case utilising an RS232 transceiver) and then run a retrieve program on the PC 12. When the retrieval of data is completed the PC 12 will tell the operator to disconnect the plug.

Note that, in the HHU 11, the START TEST BUTTON and STOP TEST BUTTON could be incorporated in the keypad 44.

The HHU 11 communicates with the SPU 10 via infrared. However, the system is not restricted to infrared communication. It can utilise any other wireless method selected. The system communicates back to the Personal Computer 12 via an interface.

This system will allow cost efficient testing of SPUs, the retrieval of test data and the permanent computer storage of such data and printout thereof. The printout can be in log book format or other such form to accord with regulatory requirements in various countries.

The system will also extend battery life, because of the charging method, and will allow the pre-determination of battery life and consequent planned battery replacement.

The system further allows testing of SPUs without interruption to mains power supply to the building or installation generally. There is thus no disturbance of normal activities.

The design of software to run a system such as described above is within the knowledge of a person skilled in the art.

The particular embodiment described above was specifically developed to facilitate compliance with Australian Standard AS 2293.2-1 (inspection and maintenance). The invention can be applied so as to meet other national and international standards, however.

A portable unit need not be used as the control unit. In a further aspect of the invention a central control unit which may be situated in a permanent location could be used, the central control unit having wireless means for communicating with a plurality of SPUs in order to access them for that information. Each SPU could be allocated an individual address.

An emergency system of the present invention may comprise an emergency system in which the emergency unit is merely programmed by a control unit as regards test parameters—status of the unit would be monitored by observing a display on the unit itself (e.g. LEDs). Alternatively, the emergency system may not include provision for the emergency unit to be programmed by the control unit, only for the test results to be unloaded into the control unit. The emergency system may include both these functions.

A system in which the emergency units are smoke detectors, fire alarms, burglar alarms, etc., could also be provided.

A system including all these types of components together and emergency lighting units could also be provided.

In the case of an emergency lighting system, the "predetermined parameters" tested by the testing means and monitored by the control unit will generally relate to the ability of the back-up power supply (e.g. Ni Cad batteries) to provide power for illumination in the event of a mains failure. Similarly, where the system is a burglar alarm or fire alarm system or a combination of systems incorporating a number of capabilities, the testing will generally normally relate to a back-up power supply, e.g. for providing power to power an alarm in event of mains cut-off. Other parameters may be tested, however, such as whether the alarm works or not (e.g. sound monitor), and the present invention is not limited only to testing of back-up power supplies.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. An emergency system for providing an emergency function, comprising a plurality of emergency units each having means for providing the emergency function in the event of failure of a primary power supply, and testing means for testing predetermined parameters of the unit relating to its capability of providing the emergency function in the event of failure of the primary power supply, and a portable control unit having an infra-red transceiver for communicating with each emergency unit to thereby perform at least one of a plurality of maintenance functions, said maintenance functions including obtaining results of a test by the testing means and instructing test parameters for each unit.

2. An emergency system in accordance with claim 1, wherein each emergency unit includes a corresponding infra-red transceiver.

3. An emergency system in accordance with claim 1, wherein the portable control unit includes means for communicating with a computer, whereby to enable downloading of test results obtained to the computer for processing.

4. An emergency system in accordance with claim 1, wherein the portable control unit includes storage means for storing a plurality of test results.

5. An emergency system in accordance with claim 1, wherein the testing means is operative to simulate failure of the primary power supply to the unit in order to test said predetermined parameters.

6. An emergency system in accordance with claim 1, wherein a back-up power supply is included to provide power for the emergency function in the event of failure of the primary power supply, and the testing means is arranged to test predetermined parameters of the back-up power supply.

7. An emergency system in accordance with claim 1, wherein the system is an emergency lighting system and each emergency unit is an emergency lighting unit arranged to provide illumination as the emergency function in the event of failure of the primary power supply.

8. A portable control unit for an emergency system for providing an emergency function wherein the emergency system comprises an emergency unit having means for providing the emergency function in the event of failure of a primary power supply, and testing means for testing predetermined parameters of the unit relating to its capability of providing the emergency function in the event of failure of the primary power supply, said portable control unit comprising an infra-red transceiver for communication with the emergency unit to thereby perform at least one of a plurality of maintenance functions, said maintenance functions including obtaining results of a test by the testing means and instructing test parameters for the unit.

9. A portable control unit in accordance with claim 3, wherein the control unit includes means for communicating with a computer, whereby to enable downloading of test results obtained to the computer for processing.

10. A portable control unit in accordance with claim 8, wherein the system unit is an emergency lighting system and each emergency unit is an emergency lighting unit arranged to provide illumination as the emergency function in the event of failure of the primary power supply.

11. An emergency unit for an emergency system, wherein the emergency unit comprises means for providing an emergency function in the event of failure of a primary power supply, testing means for testing predetermined parameters of the unit relating to its capability of providing the emergency function in the event of failure of the primary power supply, and an infra-red transceiver for communication with a control unit to thereby perform at least one of a plurality of maintenance functions, said plurality of maintenance functions including providing results of a test by the testing means to the control unit and receiving test parameter instructions from the control unit.

12. An emergency unit in accordance with claim 11, wherein the testing means is operative to simulate failure of the primary power supply to the unit in order to test said predetermined parameters.

13. An emergency unit in accordance with claim 11, wherein a back-up power supply is included to provide power for the emergency function in the event of failure of the primary power supply, and the testing means is arranged to test predetermined parameters of the back-up power supply.

14. An emergency unit in accordance with claim 11, wherein the system is an emergency lighting system and each emergency unit is an emergency lighting unit arranged to provide illumination as the emergency function in the event of failure of the primary power supply.

* * * * *